Oct. 30, 1928.
H. C. HARRISON
ENERGY TRANSLATION SYSTEM
Filed Dec. 15, 1923
1,689,339
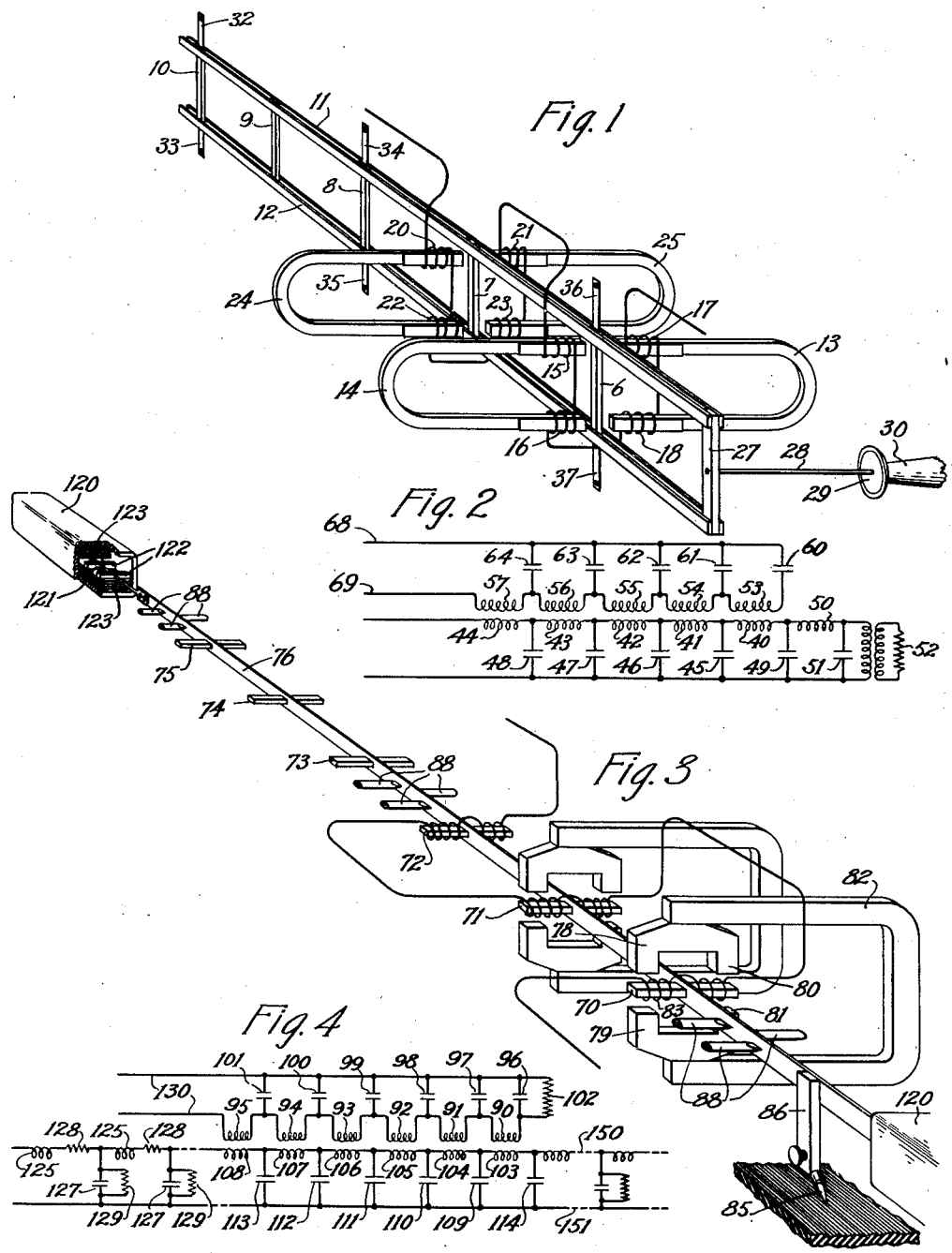
Inventor:
Henry C. Harrison,
by E. W. Adams, Atty Patented Oct. 30, 1928.

1,689,339

UNITED STATES PATENT OFFICE.

HENRY C. HARRISON, OF PORT WASHINGTON, NEW YORK, ASSIGNOR TO WESTERN ELECTRIC COMPANY, INCORPORATED, OF NEW YORK, N. Y., A CORPORATION OF NEW YORK.

ENERGY-TRANSLATION SYSTEM.

Application filed December 15, 1923. Serial No. 680,816.

This invention relates to means for translating electrical energy to mechanical energy or vice versa, and has for an object to increase the efficiency of the translation.

As is well known in the art, an electric line of a plurality of sections, each section comprising a shunt capacity and a series inductance, may be made to have a substantially constant transmission characteristic over a wide frequency range such as the range of importance in the transmission of speech or music. In order that the currents transmitted over such a line may be translated into acoustic waves or mechanical vibrations, it is proposed in accordance with one form of this invention to employ each of the series inductances of the electric line as the energizing winding for operating the corresponding vibrating members of a mechanical line. The vibrating members may be arranged so that they act accumulatively in their response to the electric currents. For example, the inductances of the electric line may be made to actuate a plurality of armatures elastically coupled together for producing the mechanical vibration of a diaphragm of a loud speaking receiver. The masses of the armatures and the elasticity of the coupling means may be adjusted to give a transmission line in which the mechanical vibration travels at the same rate as the current in the electric line associated therewith which has predetermined values of shunt capacity and series inductance. Since the mass of each armature corresponds to inductance, and the elastic coupling means to the reciprocal of capacity, the mechanical transmission line, so formed, may be made to have a substantially constant velocity of wave transmission and a high efficiency over a wide frequency range following the method employed for electric lines or filters. The manner in which the mechanical line is constructed will be better understood by reference to my copending application, Serial No. 603,005, filed November 24, 1922, on devices for the transmission of mechanical vibratory energy. Since the armatures act accumulatively it follows that the system proposed is of high efficiency and may be made to approach the ideal receiver which will develop mechanical power substantially equal to the electrical power in the energizing windings except for inherent iron, copper and frictional losses.

Referring to the drawings, Fig. 1 represents this invention embodied in a multi-armature device. Fig. 2 represents an electrical circuit equivalent to the device of Fig. 1 when the exciting windings of Fig. 1 are employed as elements of a low pass filter. Fig. 3 is a modification of the system of Fig. 1 in which the magnetic system is arranged to produce a system of rotational motion of the armatures and with both the electrical and mechanical lines terminated with pure resistances, and Fig. 4 is a circuit diagram of the system of Fig. 3.

Fig. 1 discloses this invention embodied in a multi-armature loud speaking receiver. The bars 6, 7, 8, 9 and 10 represent armatures which are elastically coupled by elastic metallic strips 11 and 12, each of which may be a double member to increase the stiffness to prevent bending in an undesired direction. Each of the armatures 6 to 10 is supported between the poles of magnetic members such as 13 and 14. The windings 15, 16, 17 and 18 are wound around the ends of the magnets 13, 14 in such a manner that alternating current in these windings will produce an alternating flux through the magnets and the armature in such a manner that the armature 6 will be pulled towards magnet 13 for current through the coil in one direction and towards magnet 14 for current in the other direction, thereby giving it a vibratory movement corresponding to the electrical vibrations present in the electric windings. Similarly, armature 7 may be pulled in the same direction as armature 6 for current in the electric windings 20, 21, 22 and 23, wound around the ends of the magnets 24 and 25. Similar magnets and windings may be associated with armatures 8, 9 and 10 to cause the direction of pull with current to be the same as armatures 6 and 7.

The elastic members 11 and 12 may be extended beyond armature 6 to a cross member 27 which is connected by a pin 28 to the diaphragm 29 of a loud speaking receiver 30. The diaphragm 29 will therefore experience a vibration built up by the cumulative action of forces on armatures 6 to 10 so that the output energy of the diaphragm 29 may be made to nearly equal the energy input to the coil. The armatures 6 to 10 may be supported in any suitable manner between the poles of the magnets. For example, certain of the armatures may be connected at their ends to spring members or reeds 32 to 37 which are suitably fastened to the receiver casing or other support (not shown). The type of magnetic system disclosed in connection with the plurality of elastically coupled armatures is illustrative of only one type of arrangement which may be employed since other types of magnetic structures may be readily substituted.

As has been shown in my copending application, Serial No. 603,005, filed November 24, 1922, the plurality of armatures 6 to 10 coupled by shunting elastic means comprising the portions of these members included between adjacent armatures, may be made to constitute a mechanical transmission line. Since the mass is the mechanical equivalent of inductance and elasticity is the mechanical equivalent of the reciprocal of capacity, by the adjustment of the values of the masses of the armatures 6 to 10 and the elasticity of the coupling members 11 to 12, the mechanical transmission line formed thereby may be made to have the velocity of wave transmission in sections per second of $$W = \sqrt{\frac{S}{M}}$$

wherein M is the effective mass of the armature and S is the shunting elasticity between adjacent armatures. The cut-off frequency of such a mechanical line will be determined by the expression $$f_c = \frac{1}{\pi}\sqrt{\frac{S}{M}}$$

The electrical equivalent of the armatures and armature coupling may be represented as in Fig. 2 in which the inductances 40 to 44 correspond respectively to the masses of the armatures 6 to 10, while the capacities 45 to 48 correspond to the reciprocal of the elasticities which couple adjacent armatures. Capacity 49 corresponds to the reciprocal of the elasticity of the coupling means between armature 6 and diaphragm 29 and may be produced, for example, by the elasticity of the elastic members 11 and 12 between armature 6 and the cross member 27. The series inductance 50 corresponds to the mass of the diaphragm 29 while the shunt capacity 51 represents the elasticity of the air chamber formed at the small end of the horn 30 in the manner described and claimed in my copending application, Serial No. 610,977, filed January 6, 1923, on speech frequency translating systems. As described in this copending application, the mechanical impedance of the air column enclosed by the horn 30 may be made to closely approximate a mechanical resistance and the impedance into which the armatures work is therefore shown in the electrical equivalent diagram as a resistance 52. The impedance of the system comprising the diaphragm and the horn, should preferably be equal to the surge impedance of a mechanical network of an infinite number of sections having masses and elasticities of values corresponding to masses 6 to 10 and the coupling elasticities of Fig. 1.

The manner in which the electric windings 15 to 18 are coupled to actuate the armature masses is illustrated in Fig. 2 by an inductance winding 53 in inductive relation to the inductance 40. The inductance 53 may therefore represent the inductance of the windings 15 to 18 which actuate armature 6 while inductance 40 represents the mass of the armature. Similarly inductance 54 is inductively coupled to inductance 41 to represent the coupling between the armature mass 7 and the windings 20 to 23 of Fig. 1. Inductances 55 to 57 similarly correspond to the inductance of the alternating current windings associated with the remaining armatures 8, 9 and 10.

In order that the inductances 53 to 57 may be included in a circuit which has a substantially constant velocity over a wide frequency range, shunting capacities 60 to 64 are employed in shunt to the line to give an electric line of a plurality of sections, each section comprising a shunt capacity and a series inductance. As described in the U. S. patent to Campbell, No. 1,227,113 of May 22, 1917, the electrical network comprising inductances 53 to 57 and capacities 60 to 64 may be adjusted to give a substantially constant velocity of transmission over a wide frequency range below a cut-off frequency. The cut-off frequency of such an electric network is given by the equation $$f_c = \frac{1}{\pi\sqrt{LC}}$$

The velocity of wave transmission is $$W = \frac{1}{\sqrt{LC}}$$

It is, of course, preferable that the velocity of wave transmission of the mechanical network should be made equal to the velocity of wave transmission of the electrical network with the same cut-off frequency in both cases, 6,000 cycles, for example. In this manner the energy is gradually transferred from the electrical to the mechanical system or vice versa.

It is also preferable for efficient transmission that the incoming signaling line 68, 69 should have a characteristic impedance eqaul to the characteristic impedance of the wave filter 53 to 57, 60 to 64 for the range of frequencies to be transmitted in order that the combined filter and line will act as a substantially pure resistance for the transmission range. In the simple case where only one winding and armature are employed, the shunting capacity for the winding should have a value $$C = \frac{1}{4\pi^2 f_c^2 L},$$

where L is inductance of winding, and $f_c$ the critical frequency. The incoming line connected to such a simple section should have a characteristic impedance equal to the characteristic impedance of the line section comprising the series inductance winding and the shunt capacity.

One possible adjustment of the mechanical and electrical networks for efficient translation of the received electrical energy into mechanical vibratory energy is to have the electrical impedance of each section of the electrical network beginning with section 57, 64 next to the line increase in impedance and terminate in a substantially open circuit. For example, if the inductance of a full section is L, the inductance 57, may have the value L/2 while inductance 56 has the value 3/2 L, 55 the value 3/2 x 3/2 L, 54 the value 3/2 x 3/2 x 3/2 L and 53 the value 3/2 x 3/2 x 3/2 x 3/2 L. Similarly, capacities 64 to 60 would have values in terms of the full wave filter section C of C, 2/3 C, 4/9 C, 8/27 C and 16/81 C. The mechanical network may be tapered in a similar manner but in the opposite way. The mass 40 has a value corresponding to the value of series mass for a full mechanical section ($m$) while mass 41 may equal 3/2 $m$, 42 may equal 9/4 $m$, 43 may equal 27/8 $m$ and 44 may equal 81/16 $m$. Similarly elasticity 49 would have a value corresponding to the shunt elasticity for the full section of the mechanical network; elasticity 45 a value 1.5 that value; elasticity 46 $1.5^2$ that value; elasticity 47 $1.5^3$ that value, and elasticity 48 $1.5^4$ that value. With such tapered and coupled electrical and mechanical networks, the energy which flows into the alternating current windings associated with the armatures finds the impedance of the electrical energy channel steadily increasing and hence transfers to the parallel mechanical channel which as steadily decreases in impedance. At each section a part of the energy transfers by means of the force produced on the armature by virtue of the electric current. For the cumulative transfer of the energy from section to section the lines need not necessarily be tapered. It is desirable that the velocity of energy transmission through this multi-armature receiver be the same in order that the energy in the two lines may remain in phase. It is obvious that energy may be gradually transferred from the electrical to the mechanical system or vice versa with equally high efficiency and with substantially constant transmission for a wide frequency range. The critical frequency of each section of both the mechanical and electrical networks are preferably the same.

Fig. 3 illustrates this invention embodied in a phonograph recorder in which the armature system is of the torsional type. The recorder comprises a plurality of armatures 70 to 75 interconnected by means of a strip 76 of elastic material possessing enough elasticity to enable a twisting or torsional movement thereof. The armature 70 is supported between the pole pieces 78 to 81 which are attached to a suitable magnet 82. Similar pole pieces and magnets may be mounted adjacent each of the other armatures 71 to 75. The armature 70 is surrounded by an alternating current winding 83 in such a manner that the alternating current flowing therethrough will produce an alternating flux in the armature 70 and the pole pieces 78 to 81 in such a manner that the strip 76 will experience a twisting force in accordance with the electrical vibrations traversing the coil 83. The remaining armatures 71 to 75 are surrounded by alternating current windings connected in series with winding 83 and arranged to experience twisting forces in the same direction as armature 70 for current in the same direction. The cumulative action of all the armatures is transmitted to the phonograph needle 85 by a suitable connecting member 86 whereby the phonograph needle 85 may be employed to produce a sound record corresponding to the electrical vibrations present in the line to which the alternating current windings surrounding the armatures are connected.

The elastic strip 76 which serves to interconnect the armatures may be supported for torsional movement in any desired manner. For example, a plurality of members 88 provided with knife edges bearing against the strip 76 on opposite sides thereof may be placed at different points along the length of the strip 76 and supported in any desired manner. These knife edge supports will enable the strip 76 to be twisted with a minimum frictional loss due to supporting arrangements.

The manner in which the apparatus of Fig. 3 may be coupled to the electric line is illustrated in Fig. 4 in which the mechanical parts of the device are illustrated by their equivalent electrical elements. The inductances 90 to 95 may represent the alternating current windings surrounding the armatures 70 to 75, respectively. These alternating current windings 90 to 95 are arranged to form a low pass filter of a plurality of sections by the addition of a plurality of shunt capacities 96 to 101, inclusive. As explained above in connection with Fig. 2 the inductances 90 to 95 and capacities 96 to 101 may be arranged to form an electrical network having a substantially constant velocity of wave transmission for all frequencies below a definite cut-off frequency above which frequency substantially no transmission occurs. Instead of having this electrical network tapered in the manner described in connection with Fig. 2 in order to avoid reflection losses, the present network may be terminated by an impedance or resistance 102 of a value equal to the surge impedance of an electrical network of an infinite number of sections, each section of which comprising an inductance such as inductance 92 and a shunt capacity such as capacity 99.

The masses of the armatures 70 to 75 are illustrated by their equivalent inductances 103 to 108, inclusive. The shunting elasticity represented by the portion 76 between adjacent armatures is illustrated by the equivalent shunt capacities 109 to 113, inclusive. The inductances 90 to 95 are shown to be inductively coupled to the inductances 103 to 108, respectively, to illustrate the coupling which exists between the alternating current windings of the device of Fig. 3 and the masses of the armatures which enable electrical power in the alternating current windings to become mechanical power in the armatures. After the inductance 103 representing the mass of armature 70, a shunt capacity 114 is shown to represent the shunt elasticity produced by the elastic strip 76 in the part which serves to connect the last armature 70 to the needle 85. The inductance 115 represents the mass of the needle 85, while the dotted lines 150, 151 indicate the connections to a network corresponding to a second mechanical resistance which may be coupled to the needle on the side away from the armatures.

In order to avoid reflection losses at the other end of the mechanical network, it sometimes may be desirable to connect to one of the strips 76 of Fig. 3 a mechanical resistance of the type disclosed, for example, in my copending application Serial No. 603,005, filed November 24, 1922. Briefly, the mechanical resistance comprises a case 120 enclosing a rod 121 to which the strip 76 may be connected. Distributed along the rod 121 are a plurality of masses 122, the vibratory motion of which is damped by a packing of foil sheets 123 on opposite sides thereof. As described in this copending application the electrical equivalent of such a mechanical resistance may be illustrated as in Fig. 4 in which the inductances 125 represent the masses 122, capacities 127, the shunting elasticity of the rod between adjacent masses, resistance 128, the mechanical resistance of the line and elements 129, the conductance of the line. The impedance of such a mechanical line may be adjusted to be substantially constant over a wide range of frequencies and for the system illustrated in Fig. 3 the value of this impedance should be $$Z = \sqrt{SM}$$

where S and M are the values of the elasticity and mass for full sections.

Another mechanical resistance similar to the one in box 120 may be added to the transmission system on the opposite side of the needle 85, if desired, to reduce reflection losses at that point.

As discussed under the description of the device in Fig. 1 the capacities 96 to 101 which are employed to furnish shunt capacities for the sections of the wave filter formed by the alternating current windings for the armatures should have such values that for speech or music impressed upon line 130 the velocity of the electrical wave transmission through the various sections of the electric filter should be the same as the velocity of the mechanical wave transmission through the armatures. In this manner the energy is gradually transferred from the electrical system to the mechanical system or vice versa with an unusually high degree of efficiency.

It is, of course, to be understood that this invention is applicable either to devices such as receivers and phonograph recorders in which is desired to translate electrical vibratory energy into mechanical vibratory energy or to other devices such as telephone transmitters and electrical phonograph reproducers in which it is desired to translate mechanical vibratory energy into electrical energy. For example, the device shown in Fig. 3 may without modification be employed as an electric phonograph reproducer by causing the needle 85 to traverse the sound record. The vibrations of needle 85 will be transferred to the armatures and the vibrations of the armatures will produce in the line connected to the alternating current windings, electrical currents corresponding in amplitude and frequency to the mechanical vibrations produced by the sound record. It is also to be understood that any desired number of armatures may be connected in the manner shown in Fig. 1 and Fig. 3 to produce a multi-armature device of high efficiency.

What is claimed is:

1. In combination, an electric wave filter of a plurality of consecutive sections and a mechanical wave filter of a plurality of consecutive sections, each of a plurality of the sections of said electric filter being coupled to a section of said mechanical filter and arranged to transfer energy in the same direction between said coupled sections.

2. In combination, an electric line of a plurality of sections, each section comprising a series inductance and a shunt capacity, a mechanical transmission line of a plurality of sections, each section comprising a series mass and a shunting elasticity, the inductance of each of said sections being coupled to the mass of the corresponding mechanical section to cause the mechanical vibration of said masses corresponding to the electrical vibrations present in said line.

3. In combination, an electric line of a plurality of sections, each section comprising a series inductance and a shunt capacity, a mechanical transmission line of a plurality of sections, each section comprising a series mass and a shunting elasticity, the inductance of each section being coupled to the mass of the corresponding mechanical section to produce in said inductances electric currents corresponding in amplitude and frequency to the mechanical vibrations of said masses.

4. In combination, an electric line of a plurality of sections, each comprising a series inductance and a shunt capacity and a mechanical system of a plurality of sections and comprising a plurality of effective masses coupled by non-dissipative means responding to frequency in the same manner as the reciprocal of the electric capacity, the elements of said mechanical system being arranged to transmit with a negligible attenuation a wide range of frequencies while suppressing frequencies outside said range, each of said inductances being arranged in operative relation to one of said masses to cause a transfer of energy therebetween.

5. In combination, a mechanical transmission line of a plurality of sections, each section comprising a series mass and a shunting elasticity, means for creating a steady magnetic flux through each of said masses, an alternating current winding in operative relation to each of said masses, and a shunt capacity connected between each adjacent pair of windings.

6. In combination, a mechanical line of a plurality of sections, each section comprising a series of armature masses and a shunting elastic element, means for creating a steady magnetic flux through each of said armatures, an alternating current winding arranged in operative relation to each of said armatures, an electric network of a plurality of sections, each section comprising a shunt capacity and one of said windings, said capacities and windings having such values that said network presents a substantially constant impedance for a wide range of frequencies to be transmitted, said armature masses and said shunting elasticities of the mechanical system having such values that said mechanical system offers a substantially constant impedance for a wide range of frequencies, the mechanical impedance of said system being substantially the same order of magnitude as the electrical impedance of said network.

7. In combination, a mechanical network of a plurality of sections and comprising a plurality of armature masses connected by shunting elastic elements, said masses and elastic elements having such values as to transmit with negligible attenuation a wide range of frequencies while suppressing frequencies outside the said range, means for creating a steady magnetic flux through said armatures, an alternating current winding in operative relation to each of said armatures, an electric wave filter of a plurality of sections, each section comprising a shunt capacity and one of said windings serially connected, said electrical network having such values of capacity and inductance per section that said network transmits with negligible attenuation a wide range of frequencies while suppressing frequencies outside of said range, the range of frequency transmission for said electrical network being substantially the same as the frequency transmission range of said mechanical network.

8. In combination, a mechanical network of a plurality of sections and comprising a plurality of armature masses coupled by an elastic strip whereby each section comprising a series mass and a shunting elasticity, a vibrating member of extensive area attached to said strip and arranged to be vibrated by the vibration of said armatures, means for creating a steady mgnetic flux through each of said armatures, an alternating current winding arranged in operative relation to each of said armatures, and an electrical network of a plurality of sections connected in tandem, each section comprising a shunt capacity and one of said windings.

In witness whereof, I hereunto subscribe my name this 5th day of December, A. D., 1923.

HENRY C. HARRISON.